(12) United States Patent
Arnoni Junior

(10) Patent No.: US 9,315,765 B2
(45) Date of Patent: Apr. 19, 2016

(54) POD FOR PROCESSING USED COOKING OILS AND PROCESSING APPARATUS

(75) Inventor: Americo Arnoni Junior, São Paulo (BR)

(73) Assignee: O2W S.A., Marinha Grande (PT)

( * ) Notice: Subject to any disclaimer, the term of this patent is extended or adjusted under 35 U.S.C. 154(b) by 1040 days.

(21) Appl. No.: 13/439,599

(22) Filed: Apr. 4, 2012

(65) Prior Publication Data
US 2012/0259024 A1    Oct. 11, 2012

(30) Foreign Application Priority Data
Apr. 6, 2011 (BR) .................................... 1101583

(51) Int. Cl.
*C11B 13/00* (2006.01)
*C11C 5/00* (2006.01)

(52) U.S. Cl.
CPC ................. *C11C 5/002* (2013.01); *C11B 13/00* (2013.01); *Y02W 30/74* (2015.05)

(58) Field of Classification Search
CPC ............ A61L 2/02; C11B 13/00; C11C 5/002
USPC ..................... 422/307, 243; 514/789; 44/275; 106/270
See application file for complete search history.

(56) References Cited

U.S. PATENT DOCUMENTS 6,079,975 A  *  6/2000  Conover ................. C11C 5/008
                                                              422/126

FOREIGN PATENT DOCUMENTS

PT                103856         2/2008
WO    WO 2010/102370 A1        9/2010

* cited by examiner

*Primary Examiner* — Sean E Conley
(74) *Attorney, Agent, or Firm* — Leason Ellis LLP (57) ABSTRACT

A pod for processing used cooking oils is disclosed that allows a higher energy efficiency of the process and better quality of the final result obtained, in view of different possible uses. This increase in terms of energy efficiency makes it possible to use an apparatus of the domestic appliance type, for processing a given quantity of used cooking oils together with the processing pod according to the invention. Providing the user with the possibility of opting among different combinations of functional substances provided in a main structure and in a secondary structure of the processing pod should, together with the possibility of using an apparatus of domestic use, allow the valorization of used cooking oils directly at the point of consumption.

24 Claims, 8 Drawing Sheets

POD FOR PROCESSING USED COOKING OILS AND PROCESSING APPARATUS

CROSS REFERENCE TO RELATED APPLICATION

This application claims priority under 35 U.S.C. §119 to Brazilian patent application No. 1,101,583-7, filed Apr. 6, 2011, which is hereby incorporated by reference in its entirety.

BACKGROUND OF THE INVENTION

1. Field of the Invention

The present invention refers to the field of recycling of used cooking oils in general, and to recycling of used cooking oils by means of their processing together with a pod including substances of the wax type and similar, in particular.

2. Background of the Invention

Considering current consumption patterns of cooking oils and the serious environmental consequences often associated with their disposal, there is a significant economic and environmental value associated with the possibility of their recycling in general, and of their valorization at the point of consumption, in particular.

In fact, such valorization directly at the point of consumption presents several advantages, notably because it avoids the logistic required for collecting used cooking oils to a central recycling or disposal location, and because it represents an additional source of economic value, allowing consumers to use a basic material for obtaining other materials or products for other uses and benefits.

However, processes for recycling used cooking oils in a domestic, or small scale commercial setting, whether this is that of a household or that of a restaurant, are conditioned by several technical and functional constraints. It is therefore particularly important that a process for recycling used cooking oils in such settings presents a set of characteristics, notably in terms of easy use (in particular, simple handling of raw materials involved) and in terms of general efficiency (in particular, obtaining the intended quality with the least energy use by the process).

In the scope of the present document, the expression "used cooking oils" refers to oils used in food in general, independently of their origin or production, for dressing or cooking, such as for example frying, or other uses, whereby oils are used or exceed their use deadline, and loose food grade value, being therefore available and suitable for recycling or final disposal. Within the meaning of the expression "used cooking oils" are further considered food oils in the liquid or solid state, as well as other substances of the fat type presenting characteristics similar to food oils.

3. Description of Related Art

The concept of processing used cooking oils together with a processing pod, as well as a machine specific for such purpose, has been disclosed by the author and is therefore known in the related art.

In fact, the author has previously researched and developed the concept of recycling used cooking oils into candles, by means of their processing together with a composition of solidifying substances, including waxes and similar substances, whereby the composition is provided in the form of a capsule, and, the process is carried out by a machine with functional characteristics specific to the production of candles and meant for a small scale usage. The author has henceforth registered the PT 103856 thereby disclosing several functional aspects of a machine for producing candles based upon the processing of used cooking oils together with a solidifying composition based upon paraffin, stearin, microcrystalline wax, essences, anilines and other stabilizers. According to the document this composition is provided in the form of a capsule of cylindrical format. However, this cylindrical format has revealed itself as disadvantageous in several aspects. Moreover, the document does not disclose any particular technical characteristics neither of the capsule, notably in view of an efficient processing thereof, that is, ensuring a complete mixture with the used cooking oils in the shortest period of time and with the least energy use. As described in detail further below, such characteristics play a determinant role in the efficiency of the process and on the quality of the candles obtained as result of it.

The WO 2010/102370 A1 discloses an apparatus of domestic use for producing soap by means of recycling used cooking oils. This document points to the addition of several compounds separately from each other and in the same form as they may be usually found in the market. In this case, there is not a composition that integrates the different substances in certain proportions as considered as relevant for obtaining the envisage results.

The documents above do not disclose solutions in terms of the constitution and configuration of a processing pod, in view of maximizing the efficiency of the process and the quality of the candles obtained by it.

In fact, the production of candles from used cooking oils, as well as other products based upon the use of a wax, or similar, raises several issues. In this sense, as main quality aspects of a resulting candle, one highlights the structural stability at ambient temperature (including during very hot summer days), the uniform visual aspect, the suppression of smells often associated with used oils, the regular and complete burning behavior, and the observation of applicable safety standards and dispositions, in particular.

SUMMARY DESCRIPTION OF THE INVENTION

The author has carried out several tests and thus established that in order to obtain a quality candle by means of an efficient process, one obtains very different results from using processing pods with different compression degree and configuration, while keeping the same composition.

For example, it has been experimentally established that the period of time required to reach a complete mixture of the processing pod with used cooking oils, resulted substantially different when using pods with the same composition but different compression degrees, as represented by its bulk density. Sometimes the fusion obtained at the end of the process did not yet present a uniform visual aspect.

Moreover, it has been established that the mixing process also takes places in a substantially more efficient way if the processing pod presents a higher specific density when compared to the used cooking oils, so that it sinks in such medium. Also in terms of the configuration of the processing pod, it has been established that certain formats lead to a much more efficient mixing process, that is requiring less time for a similar level of energy being used, and better final quality than other formats.

Moreover, it has been experimentally established that the incorporation of aromatic substances could be significantly increased and its efficacy of action significantly improved, in the case of certain compression degrees of the processing composition. This aspect has a particular relevance due to the need of suppressing unpleasant odors, sometimes very intense, of certain used cooking oils, for example those used in frying, which might otherwise compromise the final quality of the candles.

The use of a processing pod with a certain compression degree and at least a certain bulk density, according to the invention, thus allows to very significantly reduce the energy needs of the mixing process, so that a processing apparatus of smaller energy requirements may now be used, thus allowing the use of other type of appliances, other than specific for this purpose, or, alternatively, that the processing apparatus may present a substantially bigger processing capacity for the same level of energy capacity.

Moreover, it has been established that different substances, bearing different contributions to the processing of a used cooking oils load, such as, for example, a mostly structural contribution, or a mostly functional contribution, such as for example aromatic, cosmetic, or other, may be better mixed with the used cooking oils load if provided in different supports. Providing different processing compositions in respectively different supports advantageously allows a greater control over the conditions according to which different compositions are added to the mixing process, and provides the user with the option, over which complimentary elements she wishes to add to the processing of a given load of used cooking oils.

To this effect, according to an inventive aspect of the present invention, the processing pods present a main structure whose composition is mostly intended for the basic processing of a load of used cooking oils, and, should that be the option, a secondary structure, whose composition is intended for the addition of a complimentary characteristic or functionality, thereby eventually presenting a different embodiment and/or components than the main structures.

The present invention further refers to an apparatus that may include more than one processing device presenting energy requirements that are substantially similar to those of a common household appliance.

The apparatus according to the invention may be used for the production at least of the body of candles, or of a surface treatment product, or of a cosmetic product, or other, according to the functional substances included in the main structure and/or secondary structure of the processing pod according to the invention.

The goal of the present invention is thus to provide a processing pod for use in a valorization process of used cooking oils, by means of an apparatus of household type (that is, not industrial) whether specific, such as for example a used cooking oils recycling device, or available by means of an household appliance, such as for example a gas oven or a microwave oven, that ensure safety conditions in terms of thermal protection and confinement of the space in which the process takes place, with the least possible energy consumption.

This goal is solved according to the invention by means of a processing pod according to the first characteristic identified hereunder. Preferred embodiments of the processing pod according to the invention result from the other characteristics presented thereafter.

Another goal of the present invention is to identify the main characteristics of an apparatus of the type household appliance, for recycling used cooking oils in a domestic setting, by means of their processing together with at least one processing pod according to the invention.

This goal is solved according to the invention by means of an apparatus according to a first respective characteristic presented hereunder, and allowing the use, under the identified conditions, of household appliances such as for example gas oven, or, preferentially, microwave oven. Preferred embodiments of the processing apparatus according to the invention result from the secondary characteristics presented thereafter.

Moreover, the present invention points to uses of the processing pod and machine according to the invention, as presented hereunder.

The invention shall now be described in greater detail based upon preferred embodiments of the processing pod and apparatus for processing used cooking oils according to the invention, and respective drawings attached hereto.

DETAILED DESCRIPTION OF PREFERRED EMBODIMENTS OF THE INVENTION

The author has previously disclosed the possibility of recycling used cooking oils by means of their processing together with a solidifying composition. However, in practice such a process raises several difficulties in view of the process efficiency and quality of the product obtained, notably because of the widely varying nature of used cooking oils and of the comparatively high load of inconvenient compounds present in the used cooking oils, some of which being of difficult suppression. For example, in the case of frying oils, these often carry an unpleasant odor.

According to experiments carried out by the author, it has been established that processing a mixture of used cooking oils with a corresponding solidifying composition takes place in significantly more advantageous conditions, in terms of energy efficiency of the process and degree of homogeneity of the resulting fusion, when the solidifying composition is provided in the form of a processing pod (1) with certain constitution and configuration characteristics. Thus, as a first inventive aspect according to the present invention, it has been established that the efficiency of the mixing process is substantially increased in case the processing pod presents lower compression degree, that is, a lower apparent density than its reference component. As a complementary aspect, it has been established that pods with a higher surface to volume ratio could also be processed more efficiently.

According to another inventive aspect, the main structure (3) of a processing pod (1) according to the invention, results from a previous processing, preferentially carried out on the factory side, by means of melting a plurality of substances, and, in a particularly advantageous way, presents a compression degree that is inferior to the one that it would present in case of direct pouring or injection of a resulting fusion into a respective mold. For the type of components considered for the main structure (3), including a substance (A) corresponding to a wax, or similar, it thus results as particularly advantageous, when the main structure (3) presents a bulk density that is at least 10% inferior, preferentially at least 15% inferior, more preferentially at least 20% inferior, to the reference density of the substance (A).

This embodiment presents several advantages, notably in terms of the required processing energy and homogenization degree attained in a mixing process of the processing pod (1) with a load of used cooking oils. In fact, the author has experimentally determined that there is a particularly significant difference between pods that are obtained by means of direct pouring or injection of the fusion of its components, typically with higher densities, in comparison with processing pods (1) that present a lower compression degree.

According to another inventive aspect, at least the main structure (3) of the processing pod (1) presents a configuration corresponding to a high ratio of outside surface relatively to a certain volume, whereby this ratio is, according to the invention, bigger than the one of a regular cylinder of equivalent height for a given reference volume.

FIGS. 1a-1c, 2a-2c, 3a-3e, 4a-4e, represent examples of such a main structure (3) of the pod according to the invention.

FIGS. 1a-1c, 2a-2c represent a particularly simple case, of a main structure (3) with the shape of a ring or of a torus, respectively.

FIGS. 3a-3e, 4a-4e, represent an alternative of the main structure (3) in the shape of a star with several points. Naturally, as it will be apparent to the expert in the art, other forms and shapes are possible, that fulfill the same particular aspect of maximizing the outside surface to volume ratio. For example, for illustrative purposes, it would be possible to consider cylinders or spheres provided with a plurality of cavities on their surfaces.

Figure 1A:
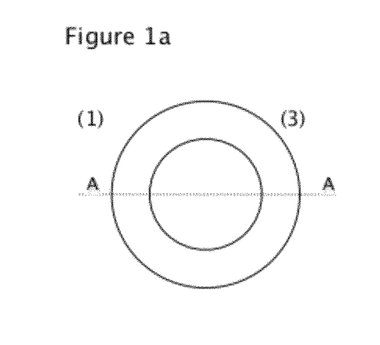
FIGS. 1a-1c: plan, side elevation and cut elevation, along the AA plane, of a first preferred embodiment of the main structure (3) of a processing pod (1) according to the invention.
Figure 1B:
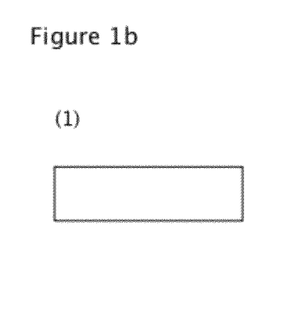
Figure 1C:
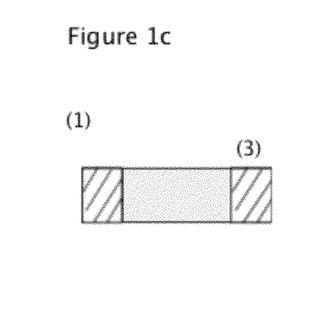
Figure 2A:
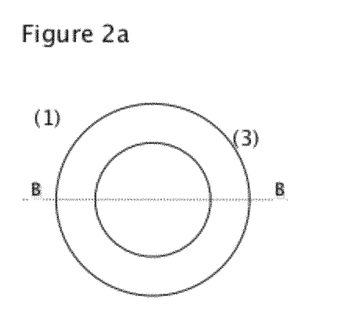
FIGS. 2a-2c: plan, side elevation and cut elevation, along the BB plane, of a second preferred embodiment of the main structure (3) of a processing pod (1) according to the invention.
Figure 2B:
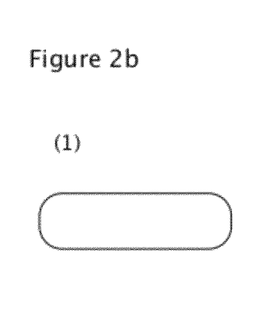
Figure 2C:
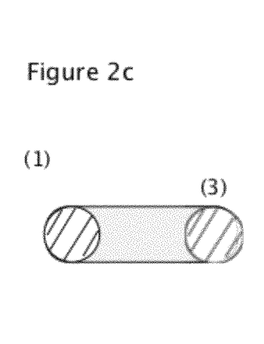
Figure 3A:
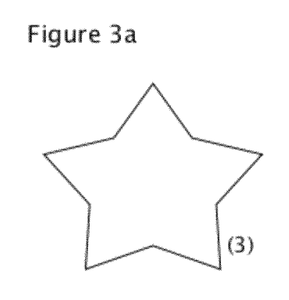
FIGS. 3a-3e: plan, side elevation and cut elevation, along the CC plane, of a third preferred embodiment of the main structure (3), with and without central hole, respectively, of a processing pod (1) according to the invention.
Figure 3B:
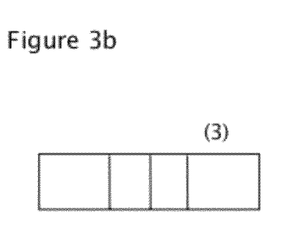
Figure 3C:
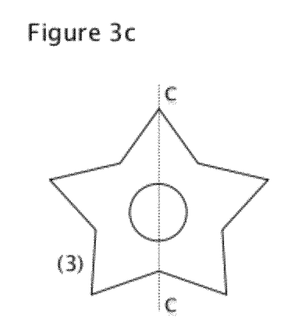
Figure 3D:
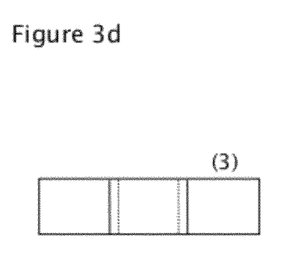
Figure 3E:
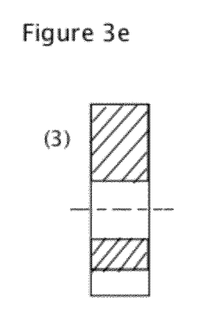
Figure 4A:
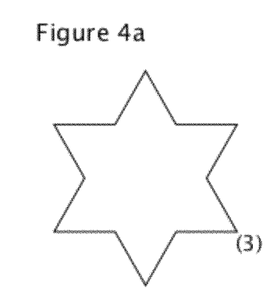
FIGS. 4a-4e: plan, side elevation and cut elevation, along the DD plane, of a fourth preferred embodiment of the main structure (3), with and without central hole, respectively, of a processing pod (1) according to the invention.
Figure 4B:
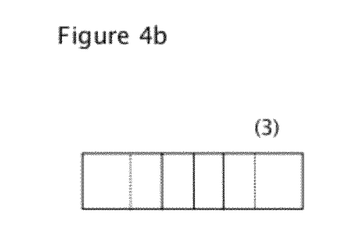
Figure 4C:
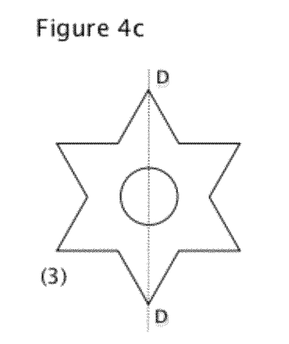
Figure 4D:
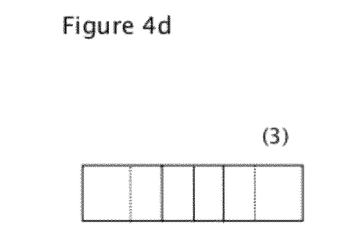
Figure 4E:
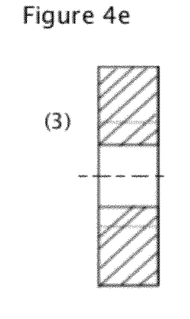
Figure 5A:
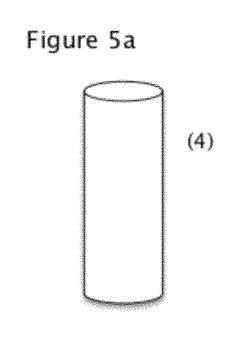
FIGS. 5a-5d: perspective views of embodiments of a secondary structure (4) with possibility of respective fit-pressing into a main structure (3) of a processing pod (1) according to the invention.
Figure 5B:
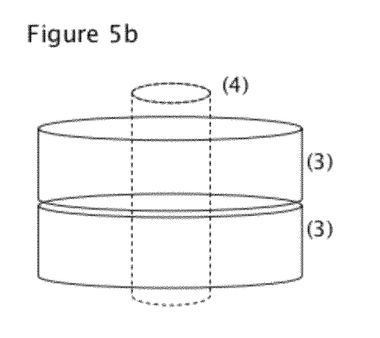

FIGS. 5a-5d represent possibilities of a first use of secondary structures (4) of a processing pod (1) according to the invention, in which the secondary structures (4) are fit-pressed, preferentially by means of a manual fit-press, in respective main structures (3). FIGS. 5a-5b thus show a view in perspective of a substantially regular cylinder form.

Figure 5C:
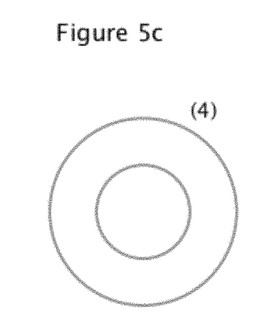
Figure 5D:
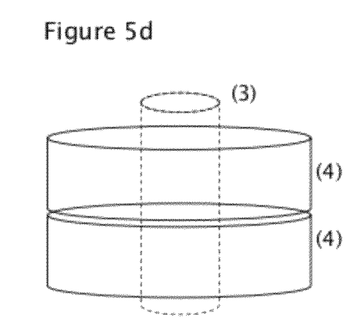
Figure 6A:
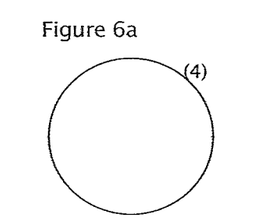
FIGS. 6a-6f: plan and side elevation views of several embodiments of a secondary structure (4) of a processing pod (1) according to the invention.
Figure 6B:
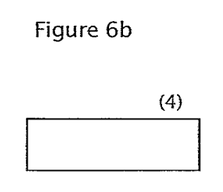
Figure 6C:
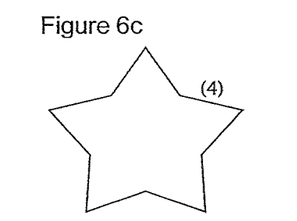
Figure 6D:
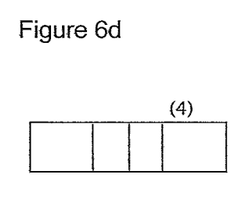
Figure 6E:
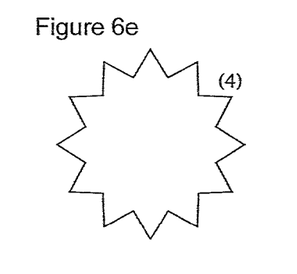
Figure 6F:
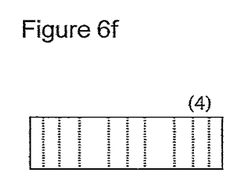

FIGS. 5c-5d show perspective views of a substantially regular circular ring form.

These may have a configuration basically similar to that of the main structures (3), or may preferentially, be configured as elements with a complementary shape, for the purpose of their engaging connection with a corresponding main structure (3). A first embodiment of secondary structure (4) presents the form of an elongated cylinder (FIG. 5a) that may be fitpressed into a respective hole provided in the main structure (3). A second embodiment corresponds to a substantially flat cylindrical ring (FIG. 5c) that may be fit-pressed onto the exterior contour of a main structure (3) with a substantially cylindrical configuration, for example. The set thus formed allows the user to select, out of a plurality of types of different components, provided in respective secondary structures (4), the one, or the ones that she wishes to add to the solidifying compound provided in the main structure (3), so as to obtain a certain product in view of a certain final use and of a certain particular characteristic thereof.

FIGS. 6a-6f show pairs of respectively plan and side elevation views of three embodiments of the secondary structure (4) presenting a star-like configuration. These secondary structures (4) may be attached side-by-side, by means of additional attaching elements, or directly fit-pressed to main structures (3) that present a hole of similar configuration.

The present invention further refers to an apparatus (2) of domestic use for processing used cooking oils together with a processing pod (1) according to the invention. This apparatus (2) at least includes a processing device (5) for processing a given quantity of used cooking oils together with at least one processing pod (1), so that the used cooking oils and the processing pod (1) are directly delivered to each processing device (5), or are delivered by means of a respective storage recipient (6).

Figure 7A:
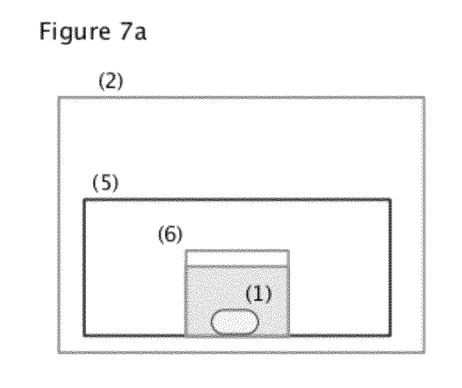
FIGS. 7a-7b: schematic representations, of a first and second embodiments, respectively, of a machine (2) of household use according to the invention, for processing used cooking oils.
Figure 7B:
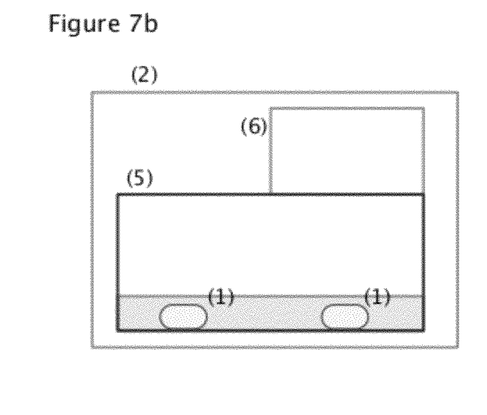

FIGS. 7a-7b are schematic representations of two embodiments of apparatus according to the present invention, whereby the first one (FIG. 7a) corresponds to an apparatus (2) of household appliance type where storage means (6) for the used cooking oils are external, and the second one (FIG. 7b) corresponds to an apparatus (2) more specific to recycling of used cooking oils that includes own storage means (6) for the used cooking oils.

The apparatus (2) according to the invention is characterized in that the processing device (5) is arranged within it so that appropriate thermal protection is provided to respective users. Moreover, the apparatus (2) may provide to the processing device (5) a thermal capacity in the range between 500-1000 W during a period of at least 240 seconds and a maximum of 360 seconds, preferentially in the range between 1000-1500 W during a period of at least 90 seconds and a maximum of 180 seconds, more preferentially with a value of 1500 W during a period of at least 60 seconds and a maximum of 120 seconds, in each processing cycle of one pod (1).

Moreover, the apparatus (2) preferentially includes manual and/or automatic means for regulating the amount of thermal power being provided to the processing device (5), and/or of the respective processing time, preferentially selected by the user at least in function of the number of processing pods (1) and/or quantity and/or condition of used cooking oils to be processed in each respective operation cycle.

For example, in case there are 3 (three) processing pods (1) being processed simultaneously in a given processing device (5), there should be manually or automatically selected a period of at least 360 seconds and a maximum of 720 seconds in case of 500-1000 W, of at least 135 seconds and a maximum of 270 seconds in case of 1000 W-1500 W, and of at least 90 seconds and a maximum of 180 seconds in case of 1500 W. Moreover, in case there is a total of 6 (six) processing pods (1) being processed simultaneously, there should be regulated a period of at least 630 seconds and a maximum of 1260 seconds in case of 500-1000 W, of at least 225 seconds and a maximum of 450 seconds in case of 1000 W-1500 W, and of at least 150 seconds and a maximum of 300 seconds in case of 1500 W.

In particular, the apparatus (2) processes a quantity of 75 up to 120 ml, preferentially of 95 up to 105 ml of used cooking oils, or equivalent, for each processing pod (1) in each operation cycle. Moreover, each processing device (5) processes a maximum of six processing pods (1), preferentially a maximum of 2 processing pods (1) in each cycle of operation.

According to a first preferred embodiment (FIG. 8*a*), the apparatus (2) works based on the manual delivery of at least one processing pod (1). In a second preferred embodiment (FIG. 8*b*), the apparatus (2) includes storage means (9) for a plurality of processing pods (1), whereby their delivery to two processing devices (5) is carried out by respective mechanical means.

Figure 8A:
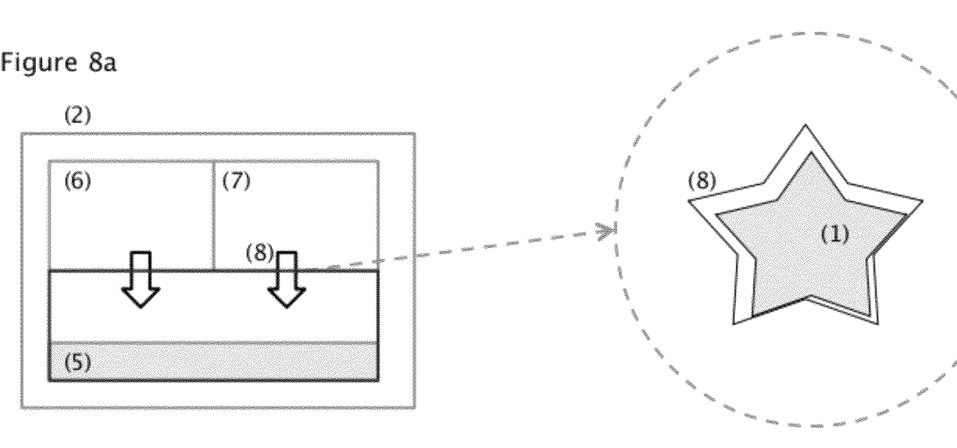
FIGS. 8a-8b: schematic representations, of a first and second embodiments, respectively, of a machine (2) according to the invention, for processing used cooking oils.
Figure 8B:
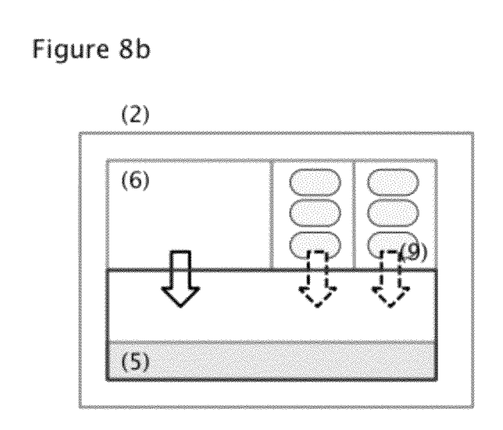

The apparatus (2) preferentially includes sensor means, preferentially electromechanical and/or electronic, for detecting the number and/or type of processing pods (1) delivered to a respective processing pod (5).

Each processing device (5) preferentially presents a pod admission (8) with a form and dimension of the passageway substantially corresponding to the form of the processing pod (1), and somewhat bigger in its outside dimension, when introduced in a given position into the pod admission (8). The processing device (5) further includes heating and mixing means, or mechanic agitation means, preferentially driven by electricity.

According to a preferred embodiment, the apparatus (2) according to the invention further includes a storage device (7) for a plurality of processing pods (1), preferentially discriminated by type, and preferentially automatic delivery means, to at least one respective processing device (5). This embodiment presents advantages, especially in the case of applications in which one intends to process a bigger quantity of used cooking oils, such as in restaurants, or similar.

According to another preferred embodiment, particularly suited for a higher intensity use, the apparatus (2) further includes at least one pod dispenser (9), for storage and automatic delivery of processing pods (1) to a respective, at least one, processing pod (5).

The present invention further refers to the use of a processing apparatus (2) for a given quantity of used cooking oils together with at least one processing pod (1) according to the invention, whereby it results in a candle, or a surface treatment product, or a cosmetic product, preferentially with an aromatic component. The use is appropriate for processing cooking oils of vegetal origin, including sunflower oil, peanut oil, palm oil, soya oil, olive oil, and similar, preferentially previously used in cooking.

According to one exemplary embodiment, a processing pod (1) for processing of a given quantity of used cooking oils, or similar substances, includes a main structure (3) made from the fusion of a plurality of substances, wherein at least one substance (A) is of the wax type, or similar, obtained in a previously defined pod configuration, wherein the main structure (3) presents a bulk density at least 10% inferior, preferentially at least 15% inferior, more preferentially at least 20% inferior to the reference density of the substance (A).

According to one exemplary embodiment, the substance (A), or similar, is of vegetal origin.

According to one exemplary embodiment, the substance (A) represents between about 50% and 100% in mass, preferentially between about 70% and 90% in mass of the main structure (3).

According to one exemplary embodiment, the substance (A) presents a reference density in the range of 0.85 to 0.95 g/cm3, preferentially in the range of 0.87 up to 0.93 g/cm3.

According to one exemplary embodiment, the main structure (3) presents a compression degree that is equal or inferior to the one resulting from directly pouring or injecting the fusion of component substances into a mold with the previously defined configuration.

According to one exemplary embodiment, the main structure (3) presents a melting point between 45 and 90° C., preferentially between 55 and 80° C.

According to one exemplary embodiment, the main structure (3) includes aromatic substances that vary between 3% and 40%, preferentially between 6% and 30% in mass.

According to one exemplary embodiment, the main structure (3) presents an outside surface to volume ratio, for a given reference volume, that is superior to that of a regular cylinder of equivalent height.

According to one exemplary embodiment, the main structure (3) presents a format with projections and/or cavities and/or holes, so as to increase its outside surface to volume ratio.

According to one exemplary embodiment, the main structure (3) presents such a format that two dimensions, preferentially its width and depth, are substantially bigger than the third.

According to one exemplary embodiment, the main structure (3) presents a symmetrical configuration along at least one central vertical plane, preferentially along at least one central vertical plane and one central horizontal plane.

According to one exemplary embodiment, the main structure (3) presents the configuration at least approximately, of a cylindrical ring, or of a torus.

According to one exemplary embodiment, the main structure (3) presents the configuration at least approximately, of a star of at least three points.

According to one exemplary embodiment, the main structure (3) presents a substantially stable configuration, preferentially with rounded upper and lower edges.

According to one exemplary embodiment, the processing pod (1) further presents, at least temporarily, a secondary structure (4) presenting a configuration and/or constitution and/or composition different from that of the main structure (3).

According to one exemplary embodiment, the secondary structure (4) includes at least one functional substance (B) of the aromatic type, surface treatment type, cosmetic type, anti-oxidizing type, coloring type, or similar, preferentially soluble on an oil base.

According to one exemplary embodiment, the secondary structure (4) includes at least one functional substance (B) of the aromatic type generating an aromatic pattern that is complementary to the one being generated by the main structure (3).

According to one exemplary embodiment, the at least one functional substance (B) represents between about 25% and 100% in mass of the secondary structure (4), preferentially between about 25% and 75% in mass.

According to one exemplary embodiment, the secondary structure (4) may be attached to the main structure (3), preferentially by means of fit-pressing.

According to one exemplary embodiment, the main structure (3) and/or the secondary structure (4) of the processing pod (1), at least before its use, is substantially enveloped by a protection element, preferentially arranged in an airtight disposition.

According to one exemplary embodiment, the protection element includes identification elements that may be read by human and/or automatic, preferentially digital, means.

According to one exemplary embodiment, the functional substance (B) is of the anti-oxidant type, and represents between about 0.125% and about 5.5% in mass, preferentially between about 0.2% and 1.6% in mass of the compound of the main structure (3).

According to one exemplary embodiment, an apparatus (2) includes at least one processing device (5) for processing a given quantity of used cooking oils together with at least one processing pod (1) according to any of the aforementioned characteristics, wherein the quantity of used cooking oils and the processing pod (1) are delivered directly to, or by means of a respective storage recipient (6), to the at least one processing device (5).

According to one exemplary embodiment, the apparatus (2) further includes a disposition and/or thermal insulation means of the processing device (5) ensuring thermal protection thereof at least during a respective operation cycle.

According to one exemplary embodiment, the apparatus (2) further includes means for manually or automatically regulating a level of thermal power to be delivered to the processing device (5) and/or a respective period of time.

According to one exemplary embodiment, the level of thermal power and/or period of time of the apparatus (2) may be selected by the user at least as a function of the number of processing pods (1) and/or quantity and/or condition of the used cooking oils to be processed in each operation cycle.

According to one exemplary embodiment, the apparatus (2) provides each processing device (5) with a value of thermal power in the range of 500-1000 W during a period of at least 240 seconds and a maximum of 360 seconds, preferentially in the range of 1000-1500 W during a period of at least 90 seconds and a maximum of 180 seconds, more preferentially a value of 1500 W during a period of at least 60 seconds and a maximum of 120 seconds, in each operation cycle of one processing pod (1).

According to one exemplary embodiment, the apparatus (2) is configured wherein simultaneously processing three pods (1) should require between about one and half to twice as long periods of time as that required for processing one pod (1), for each level of thermal power being provided to the processing device (5).

According to one exemplary embodiment, the apparatus (2) is configured wherein simultaneously processing six pods (1) should require between about two and half to three and a half as long periods of time as that required for processing one pod (1), for each level of thermal power being provided to the processing device (5).

According to one exemplary embodiment, the processing device (5) presents a volume that allows processing 75 to 120 ml, preferentially 95 to 105 ml of used cooking oils, or similar, for each processing pod (1) in each operation cycle.

According to one exemplary embodiment, each processing device (5) processes a maximum of six processing pods (1), preferentially a maximum of three processing pods (1) in each operation cycle.

According to one exemplary embodiment, each processing device (5) of the apparatus (2) presents a pod admission (8) with a configuration and dimension of the passageway that substantially corresponds to the outside configuration and dimension of the processing pod (1) when introduced in a given position into the pod admission (8). According to another characteristic, it is an apparatus (2) wherein each processing device (5) includes mechanic mixing or agitation means, preferentially driven by electricity.

According to one exemplary embodiment, the apparatus (2) further includes a storage device (7) for a plurality of processing pods (1), preferentially discriminated according to type, and preferentially automatic feeding means, to at least one respective processing device (5).

According to one exemplary embodiment, the apparatus (2) further includes sensor means, preferentially electro mechanic and/or electronic, for detecting the number and/or type of processing pods (1) delivered to a respective processing pod (5).

According to one exemplary embodiment, the apparatus (2) further includes a pod dispenser (9) for storage and preferentially also automatic feeding of processing pods (1) to a respective processing device (5).

According to one exemplary embodiment, the present invention provides a use of an apparatus according to any of the aforementioned characteristics, for processing of a given quantity of used cooking oils, or similar substances, together with at least one processing pod (1) according to any of the aforementioned characteristics in each operation cycle, wherein from the processing results at least the body of a candle, or of a surface treatment, or of a cosmetic, preferentially with an aromatic component.

According to one exemplary embodiment, the present invention provides a use wherein the used cooking oils include sunflower oil, peanut oil, palm oil, soya oil, olive oil and similar, preferentially used in cooking.

According to one exemplary embodiment, the present invention provides a use appropriate for processing used cooking oils, or similar substances, in the liquid or solid state.

What is claimed is:
1. A processing pod for processing of a given quantity of used cooking oils comprising:
   a main structure made from a fusion of a plurality of substances including a first substance (A) which comprises a wax, wherein the main structure comprises a molded structure formed in a mold having a defined pod configuration, wherein the main structure has a bulk density that is at least 10% less than a density of the first substance (A), wherein the density of the first substance (A) is in the range of 0.87 up to 0.93 g/cm3.
2. The processing pod of claim 1, where the bulk density is at least 20% less than density of the first substance (A).
3. The processing pod of claim 1, wherein the first substance (A) is of vegetal origin.
4. The processing pod of claim 1, wherein the first substance (A) represents between about 70% and 90% in mass of the main structure.
5. The processing pod of claim 1, wherein the main structure has a compression degree that is equal to or less than a compression degree that results from directly pouring or injecting the fusion of the plurality of substances into a mold that has the defined pod configuration.
6. The processing pod of claim 1, wherein the main structure has a melting point between about 55 and 80° C.
7. The processing pod of claim 1, wherein the main structure includes aromatic substances that vary between 6% and 30% in mass of the total main structure.
8. An apparatus for processing used cooking oil comprising:
   at least one processing device for processing a given quantity of the used cooking oil; and
   at least one processing pod formed of a solidifying composition for mixing with the quantity of the used cooking oil, wherein the processing pod includes a first structure that is formed from a fusion of a plurality of substances including a first substance (A) that is a wax;
      wherein the processing device includes an entrance for the processing pod to permit the processing pod to be introduced into contact with the used cooking oil;
   wherein the processing pod is constructed and the apparatus has a volume to process a quantity of between 75 ml and 125 ml of the used cooking oil for each processing pod in each operation cycle of the processing device.
9. The apparatus of claim 8, where the processing device includes at least one of a disposition and thermal insulation means ensuring thermal protection thereof at least during a respective operation cycle.

10. The apparatus of claim 8, further including means for manually or automatically regulating a level of thermal power to be delivered to the processing device and/or a respective period of time.

11. The apparatus of claim 10, wherein at least one of a level of thermal power and a period of time of the apparatus can be selected by the user at least as a function of at least one of the number of processing pods, quantity of the used cooking oils and a condition of the used cooking oils to be processed in each operation cycle.

12. The apparatus of claim 8, wherein each processing device has a value of thermal power in the range of 500-1000 W during a period of at least 240 seconds and a maximum of 360 seconds.

13. The apparatus of claim 12, where each processing device has a value of 1500 W during a period of at least 60 seconds and a maximum of 120 seconds, in each operation cycle of one processing pod.

14. The apparatus of claim 8, wherein each processing device processes a maximum of three processing pods in each operation cycle.

15. The apparatus of claim 8, wherein each processing device of the apparatus presents a pod admission with a configuration and dimension of the passageway that substantially corresponds to the outside configuration and dimension of the processing pod when introduced in a given position into the pod admission.

16. The apparatus of claim 8, further including a storage device for a plurality of processing pods, wherein the storage device is discriminated according to pod type and includes an automatic feeding means for introducing the processing pod to the processing device.

17. The apparatus of claim 8, further including a sensor means for detecting at least one of a number and a type of processing pods delivered to the processing device.

18. The apparatus of claim 8, wherein the used cooking oils is processed together with the at least one processing pod to form at least one product selected from the group consisting of a body of a candle, a surface treatment, and a cosmetic.

19. A processing pod for processing of a given quantity of used cooking oils comprising:
    a first structure made from a fusion of a plurality of substances including a first substance (A) which comprises a wax; and
    a second structure that is separate from the first structure;
    wherein one of the first and second structures has a through hole through which the other of the first and second structures passes resulting in the first and second structures being coupled to one another by a press-fit;
    wherein the second structure is formed of at least one functional substance (B) selected from the group consisting of an aromatic, a surface treatment, a cosmetic, an anti-oxidant, and a color agent, wherein the functional substance (B) is soluble on an oil base; and
    wherein the at least one functional substance (B) represents between about 25% and 75% in mass of the second structure.

20. The processing pod of claim 19, wherein the second structure has at least one of a configuration, a constitution and a composition different from that of the first structure.

21. The processing pod of claim 20, wherein the second structure is attached to the first structure by means of fit-pressing.

22. The processing pod of claim 20, wherein the functional substance (B) is an anti-oxidant, and represents between about 0.125% and about 5.5% in mass of the compound of the first structure.

23. The processing pod of claim 20, wherein the functional substance (B) is an anti-oxidant, and represents between about 0.2% and 1.6% in mass of the compound of the first structure.

24. The processing pod of claim 19 wherein one of the first and second structures has a ring shape and the other of the first and second structures has a cylindrical shape that is disposed within the through hole extending through the ring shape.

* * * * *